United States Patent
Yu

(10) Patent No.: US 11,975,266 B2
(45) Date of Patent: *May 7, 2024

(54) ATTRIBUTE VALUE RESTORATION METHOD AND APPARATUS, STORAGE MEDIUM, AND ELECTRONIC DEVICE

(71) Applicant: TENCENT TECHNOLOGY (SHENZHEN) COMPANY LIMITED, Guangdong (CN)

(72) Inventor: Fan Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/993,451

(22) Filed: Nov. 23, 2022

(65) Prior Publication Data

US 2023/0092287 A1  Mar. 23, 2023

Related U.S. Application Data

(63) Continuation of application No. 17/223,409, filed on Apr. 6, 2021, now Pat. No. 11,534,691, which is a
(Continued)

(30) Foreign Application Priority Data

Jan. 31, 2019 (CN) .......................... 201910100382.8

(51) Int. Cl.
*A63F 13/58* (2014.01)
*A63F 13/285* (2014.01)
(Continued)

(52) U.S. Cl.
CPC ............ *A63F 13/58* (2014.09); *A63F 13/285* (2014.09); *A63F 13/533* (2014.09); *A63F 13/5375* (2014.09); *A63F 13/54* (2014.09)

(58) Field of Classification Search
CPC ...... A63F 13/58; A63F 13/285; A63F 13/533; A63F 13/5375; A63F 13/54; A63F 13/35;
(Continued)

(56) References Cited

U.S. PATENT DOCUMENTS

| 2007/0190494 | A1* | 8/2007 | Rosenberg | .............. A63F 13/79 |
| | | | | 463/40 |
| 2011/0183751 | A1* | 7/2011 | Ueshima | ................ A63F 13/213 |
| | | | | 463/40 |

(Continued)

FOREIGN PATENT DOCUMENTS

| CN | 104346507 A | 2/2015 |
| CN | 106302418 A | 1/2017 |

(Continued)

OTHER PUBLICATIONS

Office Action dated Mar. 17, 2023 from the Korean Patent Office in Application No. 10-2021-7014708.

(Continued)

*Primary Examiner* — Michael A Cuff
(74) *Attorney, Agent, or Firm* — Sughrue Mion, PLLC

(57) ABSTRACT

An attribute value restoration method and apparatus, a storage medium, and an electronic device are provided. The method includes: obtaining a current attribute value of a life attribute of a first object in a virtual scene displayed by a client; based on a determination that the current attribute value is a first threshold, controlling a target attribute of the first object to become effective, the target attribute having an attribute value in a preset range, and controlling the attribute value of the target attribute to start to decrease in the preset range; and restoring the attribute value of the life attribute of the first object to a third threshold based on a determination that a target operation triggered by using the client is completed before the attribute value of the target attribute (Continued)

decreases to a second threshold in the preset range, the third threshold being greater than the first threshold.

20 Claims, 8 Drawing Sheets

Related U.S. Application Data continuation of application No. PCT/CN2019/128189, filed on Dec. 25, 2019.

(51) Int. Cl.
*A63F 13/533* (2014.01)
*A63F 13/5375* (2014.01)
*A63F 13/54* (2014.01)

(58) Field of Classification Search
CPC ...... A63F 13/822; A63F 13/837; A63F 13/55; A63F 13/42; G06Q 50/10
USPC .......................................................... 463/31
See application file for complete search history.

(56) References Cited

U.S. PATENT DOCUMENTS

| | | |
|---|---|---|
| 2013/0095919 A1 | 4/2013 | Saito et al. |
| 2013/0244764 A1 | 9/2013 | Arnone et al. |
| 2015/0157929 A1* | 6/2015 | Hall ........................ A63F 13/85 463/25 |
| 2019/0081848 A1 | 3/2019 | Zou |

FOREIGN PATENT DOCUMENTS

| | | |
|---|---|---|
| CN | 107913521 A | 4/2018 |
| CN | 109806588 A | 5/2019 |

OTHER PUBLICATIONS

Gamer Sky, May 19, 2015, https://ol.gamersky.com/z/warframe/201505/587022_5.shtml, pp. 1-7 (7 total pages).
"How to not die when you pass out in Battlegrounds?!", YouTube, Dec. 3, 2017, <https://www.youtube.com/watch?v=YVOIcDCe-_c>.
"Warframe: Comprehensive Analysis of the Properties and Skills of the Armor", May 15, 2015, retrieved from the internet: URL: <https://ol.gamersky.com/z/warframe/201505/587022_5.shtml> (16 pages total).
Borderlands, Wikipedia, 2018, [online] URL: <https://ja.wikipedia.org/w/index.php?title=Borderlands&oldid=70837126>, pp. 1-5 (5 pages total).
CN First Office Action for CN 201910100382.8 dated Dec. 3, 2019.
CN Second Office Action for CN 201910100382.8 dated Apr. 15, 2020.
CN Third Office Action for CN 201910100382.8 dated Jun. 19, 2020.
Communication dated May 30, 2022, issued in Japanese Application No. 2021-522060.
International Search Report for PCT/CN2019/128189 dated Mar. 27, 2020 [PCT/ISA/210].
Written Opinion for PCT/CN2019/128189 dated Mar. 27, 2020 [PCT/ISA/237].
Aweblade4, "Health vs Shields vs Armor (Warframe)", https://www.youtube.com/watch?v=fAqUpZ8xahA, Jun. 10, 2018.
Darthmufin, "Fastest Shield Recharge In Warframe (Without Arcanes)", https://www.youtube.com/watch?v=PilzyD0xugs, Oct. 21, 2016.

* cited by examiner

ATTRIBUTE VALUE RESTORATION METHOD AND APPARATUS, STORAGE MEDIUM, AND ELECTRONIC DEVICE

CROSS-REFERENCE TO RELATED APPLICATION(S)

This is a continuation application of U.S. application Ser. No. 17/223,409, filed Apr. 6, 2021, application is a bypass continuation application of International Application No. PCT/CN2019/128189, filed Dec. 25, 2019, which claims priority to Chinese Patent Application No. 201910100382.8 filed with the Chinese Patent Office on Jan. 31, 2019 and entitled "ATTRIBUTE VALUE RESTORATION METHOD AND APPARATUS, STORAGE MEDIUM, AND ELECTRONIC DEVICE", the disclosures of which are herein incorporated by reference in their entireties.

FIELD

The disclosure relates to the Internet field, and specifically, to an attribute value restoration method and apparatus, a storage medium, and an electronic device.

BACKGROUND

With the development of multimedia technologies and the popularity of wireless networks, online entertainment activities become more abundant. For example, users play games online by using handheld media devices, or play standalone or online games by using computers. In addition, there are various types of games, such as shooting games, adventure games, simulation games, role playing games, board games, and other games.

In many types of games, players may choose to play games with other players, or may choose to play games with the game artificial intelligence (AI) (e.g., a non-player controlled character) in the games. For example, in a shooting game, when an amount of health (or energy) of a player character drops to zero, the character dies and then enters a respawning stage after a long wait. After respawning, the player character gains full health and then enters the game again.

SUMMARY

Example embodiments of the disclosure provide an attribute value restoration method and apparatus, a storage medium, and an electronic device, to resolve at least a technical problem in the related art technology that an object is respawned in a relatively undiversified manner.

According to one aspect of the embodiments of the disclosure, an attribute value restoration method is provided, including: obtaining a current attribute value of a life attribute of a first object in a virtual scene displayed by a client; based on a determination that the current attribute value is a first threshold, controlling a target attribute of the first object to become effective, the target attribute having an attribute value in a preset range, and controlling the attribute value of the target attribute to start to decrease in the preset range; and restoring the attribute value of the life attribute of the first object to a third threshold based on a determination that a target operation triggered by using the client is completed before the attribute value of the target attribute decreases to a second threshold in the preset range, the third threshold being greater than the first threshold.

According to another aspect of the embodiments of the disclosure, an attribute value restoration apparatus is further provided, including: at least one memory configured to store program code; and at least one processor configured to read the program code and operate as instructed by the program code, the program code including: obtaining code configured to cause at least one of the at least one processor to obtain a current attribute value of a life attribute of a first object in a virtual scene displayed by a client; control code configured to cause at least one of the at least one processor to, based on a determination that the current attribute value is a first threshold, control a target attribute of the first object to become effective, the target attribute having an attribute value in a preset range, and control the attribute value of the target attribute to start to decrease in the preset range; and restoration code configured to cause at least one of the at least one processor to restore the attribute value of the life attribute of the first object to a third threshold based on a determination that a target operation triggered by using the client is completed before the attribute value of the target attribute decreases to a second threshold in the preset range, the third threshold being greater than the first threshold.

According to another aspect of the embodiments of the disclosure, a non-transitory computer-readable storage medium is further provided, the storage medium including a program stored therein, the program, when run, performing the foregoing method.

According to another aspect of the embodiments of the disclosure, an electronic device is further provided, including a memory, a processor, and a computer program that is stored in the memory and that may be run on the processor, the processor performing the foregoing method by using the computer program.

According to another aspect of the embodiments of the disclosure, a computer program product including instructions is further provided, the computer program product, when run on a computer, causing the computer to perform the foregoing method.

BRIEF DESCRIPTION OF THE DRAWINGS

The accompanying drawings described herein are used for providing a further understanding of the disclosure, and form part of the disclosure. Exemplary embodiments of the disclosure and descriptions thereof are used for explaining the disclosure, and do not constitute any inappropriate limitation to the disclosure. In the accompanying drawings:

FIG. 7b is a line drawing corresponding to FIG. 7a.

FIG. 8b is a line drawing corresponding to FIG. 8a.

DETAILED DESCRIPTION

In order to make a person skilled in the art better understand the solutions of the disclosure, the following clearly and completely describes the technical solutions in the embodiments of the disclosure with reference to the accompanying drawings in the embodiments of the disclosure. Apparently, the described embodiments are only some of the embodiments of the disclosure rather than all of the embodiments. All other embodiments obtained by a person of ordinary skill in the art based on the embodiments of the disclosure without creative efforts shall fall within the protection scope of the disclosure.

In this specification, the claims, and the accompanying drawings of the disclosure, the terms "first", "second", and so on are intended to distinguish similar objects but do not necessarily indicate a specific order or sequence. It is to be understood that data (or any element) termed in such a way is interchangeable in proper circumstances, so that the embodiments of the disclosure described herein may be implemented in other sequences than the sequence illustrated or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

According to one aspect of the embodiments of the disclosure, a method embodiment of an attribute value restoration method is provided.

Figure 1:
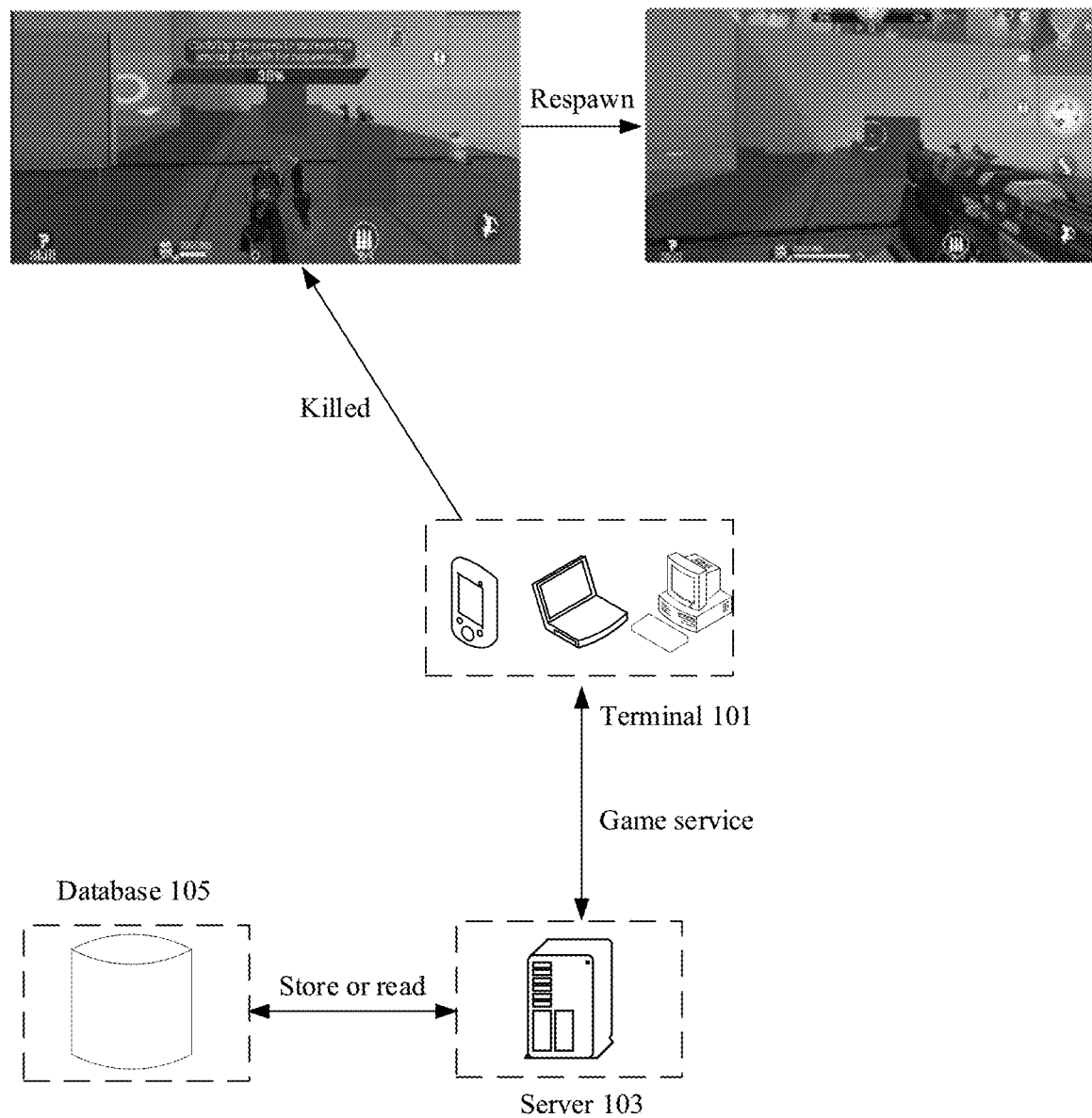
FIG. 1 is a schematic diagram of a hardware environment of an attribute value restoration method according to an embodiment of the disclosure.

Optionally, in this embodiment, the attribute value restoration method may be applied to a hardware environment including a terminal 101 shown in FIG. 1. Optionally, the hardware environment may further include a server 103. As shown in FIG. 1, the server 103 is connected to the terminal 101 through a network, and may be configured to provide a service (such as a game service or an application service) to the terminal or a client installed on the terminal. A database 105 may be set up on the server or independent of the server, to provide a data storage service to the server 103. The network includes, but is not limited to, a wide area network, a metropolitan area network, or a local area network. The terminal 101 is not limited to a PC, a mobile phone, a tablet computer, and the like.

The attribute value restoration method of the embodiments of the disclosure may be performed by the terminal 101. Alternatively, the attribute value restoration method of the embodiments of the disclosure may be performed by a client installed on the terminal 101. Scenes to which the technical solution of the disclosure is applicable include, but are not limited to, the following scenes described below.

The technical solution of the disclosure may be applied to a social scene using augmented reality (AR), virtual reality (VR), and other technologies. In this case, the social scene provided is equivalent to a virtual scene in a social application using AR, VR, and the like. After login of a user, there is a virtual object (equivalent to a first object described below) corresponding to the logged-in user in the virtual scene. Life states of the virtual object in the virtual scene include spawning, activities, death, respawning, and the like. For example, when an amount of health of the virtual object (corresponding to a life attribute described below) is fully depleted, the virtual object dies. After death, the virtual object may respawn. Such gameplay is relatively undiversified. However, the technical solution of the disclosure may be used for enriching the gameplay. When the amount of health (or energy) of the virtual object is fully depleted, the virtual object does not die immediately, but enters an "impending death" state (equivalent to a target attribute that becomes effective). In such a state, a temporary amount of health (that is, an amount of health used by a character in a game in some special states, which is an amount of health that appears and disappears in a short period of time and is equivalent to an attribute value of a target attribute) configured for the "impending death" state continues to drop. During the process in which the temporary amount of health drops, a player may respawn in this state through a series of operations, so that the respawned player does not need to enter a death state and does not need to go to a base for respawning.

The technical solution of the disclosure may also be applied to a game scene, such as a multiplayer online battle arena (MOBA) game, a first-person shooter game (FPS) game, or a third-person shooter game (TPS) game. In this case, a game scene provided by the game is equivalent to a virtual scene. When a player is in a process of the game, there is a game character (equivalent to a first object described below) corresponding to the player in the virtual scene. Life states of the game character in the virtual scene include spawning, battles, death, and respawning. For example, when an amount of health of the game character is fully depleted, the game character dies. After death, the game character may respawn. Such gameplay is relatively undiversified. However, the technical solution of the disclosure may be used for enriching the gameplay. When the mount of health of the game character is fully depleted, the game character does not die immediately, but enters an "impending death" state. In such a state, a temporary amount of health designed for the "impending death" state continues to drop. During the process in which the temporary amount of health drops, the player may respawn in this state through a series of operations, without entering a death state for respawning.

Figure 2:
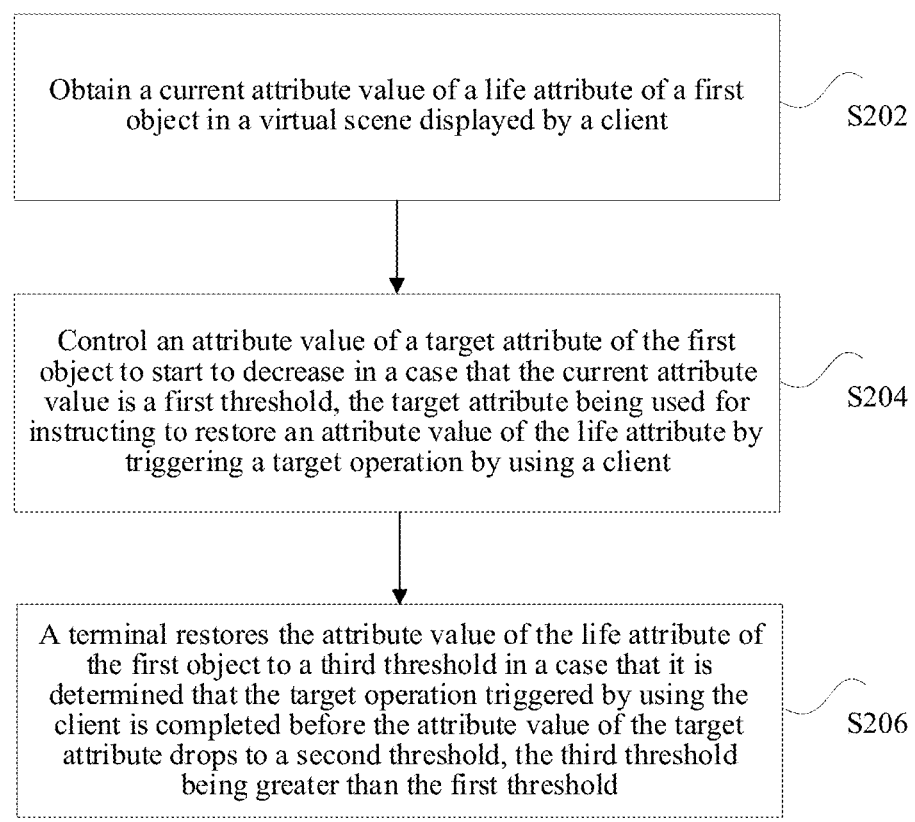
FIG. 2 is a flowchart of an optional attribute value restoration method according to an embodiment of the disclosure.

A process of respawning a first object by using the technical solution of the disclosure in the foregoing scene is described in detail below with reference to FIG. 2. FIG. 2 is a flowchart of an optional attribute value restoration method according to an embodiment of the disclosure. As shown in FIG. 2, the method may include the following operations S202-S206:

S202: A terminal obtains a current attribute value of a life attribute of a first object in a virtual scene displayed by a client.

The client is a client formed after a game application such as a MOBA game application or a shooting game application or a social application using AR, VR, or other technologies is installed on the terminal. A game scene, a social scene, or the like provided by the client is the virtual scene. An object (such as a first object or a second object) is an object related to a user in the virtual scene. In an example, the object is a mapping of the user (that is, a virtual object used for representing the user) or a friend of the user in the social scene. In another example, the object is a character controlled by the user or a character attacked by the user in the game.

The life attribute is an attribute used for representing a life state of the first object. When an attribute value of the life attribute is within a normal range (that is, a first range), for example, between [0, 100], it indicates that the life state of the first object is a normal state of being alive. When the attribute value of the life attribute reaches a first threshold (for example, "0"), the first object immediately dies or dies after an intermediate state.

S204: The terminal controls an attribute value of a target attribute of the first object to start to decrease when the current attribute value is a first threshold, the target attribute being used for instructing to restore an attribute value of the life attribute by triggering a target operation by using a client.

The target attribute is a newly added attribute of the first object, such as a temporary amount of health or a temporary time (or referred to as a duration of an "impending death" state). The target attribute becomes effective when the life attribute (or referred to as a fixed amount of health) of the first object decreases to a certain value (that is, the first threshold). When the target attribute becomes effective, the attribute value of the target attribute may fall within a range (that is, a second range). After the target attribute becomes effective, the attribute value of the target attribute starts to decrease from an upper limit value of the second range. During a period in which the temporary amount of health becomes effective, that is, before the temporary amount of health decreases to a lower limit (that is, a second threshold) of the second range, the life attribute may be restored by triggering the target operation. In other words, after the amount of health provided by the life attribute is fully depleted, the first object does not die immediately, but enters the "impending death" state (that is, a state in which the target attribute becomes effective). During this period, the target operation may be performed to respawn the first object, or even enable the first object to enter another non-death state.

The target operation triggered by using the client may be an operation performed by a user in the client, for example, an operation performed by the user on a joystick, or a tap operation on a touchscreen; or may be an operation of a first object that is triggered by using the client, such as a shooting operation, a running operation, an attack operation, or a skill casting operation of the first object in the virtual scene.

S206: The terminal restores the attribute value of the life attribute of the first object to a third threshold when it is determined that the target operation triggered by using the client is completed before the attribute value of the target attribute drops to a second threshold, the third threshold being greater than the first threshold and not greater than an upper limit value of a first range.

When the target operation is completed within an effective period (that is, before the attribute value decreases to the second threshold), the first object is respawned to restore health. The restoration herein may mean that health of the first object is partially or completely restored. That is, the current attribute value of the life attribute of the first object is updated to a value equal to or less than the upper limit value of the first range.

If the target operation is not triggered when the attribute value of the target attribute drops to the second threshold, or a triggered target operation is not completed (that is, the target operation fails to be completed within the effective period), the first object enters a death state.

In the foregoing embodiment, as an example for description, it is described that the attribute value restoration method of the embodiments of the disclosure is performed by the terminal 101. Optionally, the attribute value restoration method of the embodiments of the disclosure may alternatively be performed by the server 103. A difference from the foregoing embodiment is that an execution body is changed from the terminal 101 to the server 103.

Optionally, the attribute value restoration method of the embodiments of the disclosure may alternatively be jointly performed by the server 103 and terminal 101. For example, the terminal 101 obtains the current attribute value of the life attribute of the first object in the virtual scene displayed by the client, and notifies the current attribute value to the server 103. The server 103 controls the attribute value of the target attribute of the first object to start to decrease when the current attribute value is the first threshold. The terminal 101 detects that the target operation is triggered in the client, to restore the attribute value of the life attribute of the first object to the third threshold when it is determined that the target operation triggered by using the client is completed before the attribute value of the target attribute drops to the second threshold, and notifies the server 103 that the attribute value of the life attribute of the first object has been restored to the third threshold.

In a related art technology, a player character, a social object, or the like falls to the ground to be in a death state, waiting for respawning only after the death. Consequently, an entire process is without struggle and autonomous survival, and the player character, the social object, or the like only has to wait passively for rescue, and may only wait for death if there is no rescue.

According to S202 to S206, when the current attribute value is the first threshold, the terminal controls the attribute value of the target attribute of the first object to fall within the second range and start to decrease in the second range, that is, the first object enters the impending death state. Before the attribute value of the target attribute drops to the second threshold, if detecting the target operation triggered by the client, the terminal restores the attribute value of the life attribute of the first object to the third threshold, that is, completes the respawning of the first object. This resolves a technical problem in the related art technology that an object is respawned in a relatively undiversified manner, thereby achieving a technical effect of respawning the object while enriching the gameplay of the user. Also, because the technical solution of an example embodiment does not require entering into a respawning stage with a wait time, which delays the gameplay, as in the related art, more speedy and efficient gameplay becomes possible.

For example, the technical solution of the disclosure is applied to a game. In a game of the related art technology, if a health bar (as an example corresponding to the attribute value of the life attribute) of a character (as an example corresponding to the first object) decreases to zero, the character immediately dies, or has to wait for rescue by a teammate, without a state of falling to the ground for impending death. In the related art methods, there is no other gameplay in the state of falling to the ground for impending death. Consequently, the entire process is without struggle and autonomous survival, and the character immediately dies when a temporary amount of health automatically decreases to zero or has to only wait passively for rescue, and dies if there is no rescue.

On the other hand, according to the technical solution of the disclosure, the player may perform special gameplay (that is, the target operation) such as shooting or a QTE (that is, quick time event, in which during an actual game, the player may react quickly to a key that appears on a game screen and press a key corresponding to the screen) in the impending death state, so as to avoid death and to be respawned. In addition, in this process, the special gameplay may bring fun and positive feedback and enhanced immersiveness to the player, and free the player from various negative feedback caused by helplessness in the immediate death or death without rescue in the related art methods. The technical solution of the disclosure is further described in detail below with reference to operations shown in FIG. 2. The technical solution of the disclosure may be applied to social and other fields in a manner similar to the case in which the technical solution of the disclosure is applied to a game, and details are not described again.

In the technical solution provided in S202, the terminal obtains the current attribute value of the life attribute of the first object in the virtual scene displayed by the client.

In a game, a cycle that a character generally goes through within the game includes: spawning, battle, death, and respawning. After being spawned, the character has a fixed amount of health (corresponding to the life attribute). In a common battle process of the character within the game, the fixed amount of health may stay on a panel and is an amount of health that the character may use for a long time. After the fixed amount of health is fully depleted, the character dies.

Optionally, in S202, the obtaining, by the terminal, a current attribute value of a life attribute of a first object in a virtual scene displayed by a client may be implemented in, but not limited to, the following manner: (1) reading the current attribute value of the life attribute of the first object through an interface provided by the foregoing application, for example, an interface used for reading a fixed amount of health and provided by the game application; and/or (2) taking a screenshot of a display interface of the client, determining the current attribute value of the life attribute of the first object by identifying a picture obtained from the screenshot, for example, identifying a panel of a current game screen, and then reading a current amount of health from the panel.

In the technical solution provided in S204, the terminal controls the attribute value of the target attribute of the first object to start to decrease in the second range when the current attribute value is the first threshold, the target attribute being used for instructing to restore the attribute value of the life attribute by triggering the target operation by using the client.

The solution provided in S204 is equivalent to adding a process of autonomous survival through the target operation between death and respawning, to enrich the gameplay of the game. In other words, after the amount of health of the character is fully depleted, the character does not die immediately, but may fall to the ground to enter the "impending death" state. In this state, the player may respawn through a series of operations, and even enter another non-death state, such as respawning by killing enemies and respawning through a QTE operation.

Optionally, to maintain synchronization of information between the client and the server, an item identifier (such as a sword identifier or a gun identifier) of a first item may be sent to the server before the operation triggered by using the client is detected, where the server is configured to switch an item currently used by the first object to the first item according to the received item identifier of the first item; and/or when the target operation triggered by using the client is completed before the attribute value of the target attribute drops to the second threshold, an item identifier of a second item used by the first object after switching of the first item to the second item is sent to the server, where the server is configured to switch the currently used item to the second item according to the received item identifier.

Optionally, when the current attribute value is the first threshold, a screen in which the first object switches from a first posture to a second posture may be played on the client, where the first posture is a posture of the first object before the attribute value of the life attribute drops to the first threshold, and the second posture is a state corresponding to a case that the attribute value of the life attribute is the first threshold. For example, the first posture is a standing posture, and the second posture is a falling-to-ground posture. When the fixed amount of health of the first object in the game is fully depleted, a game screen of the first object falling to the ground is played, to highlight that the first object enters an "autonomous survival" state (or referred to as an impending death state).

Optionally, when the current attribute value is the first threshold, the first object enters the "autonomous survival" state. In "autonomous survival", the first object may be in a limited state, to increase fun and immersiveness of the game, including but not limited to one of the following:

setting a movable area of the first object to a target sub-area in a target area, where the target area is an area in which the first object is allowed to move in the virtual scene before the attribute value of the life attribute drops to the first threshold, and the target sub-area is a sub-area in which the first object is currently located in the target area; that is, in the "autonomous survival" state, restricting the first object to a relatively small area, or even unable to move in the game scene;

setting an executable action of the first object to a target action in an action set, where the action set includes a plurality of actions that the first object is allowed to execute before the attribute value of the life attribute drops to the first threshold, and the target action is an action that is included (or subset) in the action set and that is allowed to execute when the attribute value of the life attribute is the first threshold; that is, in the "autonomous survival" state, restricting action skills of the first object, and allowing the first object to use only at least one or some of the action skills, which are executable under a normal condition; and setting a usable item of the first object to a target item in an item set, where the item set includes a plurality of items that the first object is allowed to use before the attribute value of the life attribute drops to the first threshold, and the target item is an item that is included (or subset) in the item set and that the first object is allowed to use when the attribute value of the life attribute is the first threshold; that is, restricting usable items of the first object, and allowing the first object to use at least one or some of items, which are usable under a normal condition in the "autonomous survival" state.

Optionally, the controlling an attribute value of a target attribute of the first object to start to decrease in the second range includes: decreasing the attribute value of the target attribute of the first object once every time period, where in this case, the terminal controls the attribute value of the target attribute of the first object to decrease according to an elapsed time t, where the decrease herein may be a linear decrease, such as decreasing by a fixed value k every time period, and a decreased value is $yt=y0-kt$; or the decrease herein may be a non-linear decrease, for example, $yt=y0-kt^2/2$; and/or decreasing, when an attack operation of a third object (e.g., an enemy) on the first object in the virtual scene is detected, the attribute value of the target attribute of the first object according to the attack operation, that is, correspondingly decreasing the attribute value of the target attribute of the first object when the first object is attacked by another object, where for example, a corresponding attack value is dynamically or statically set for a skill in the game, and the attack value corresponds to a decrease in the attribute value of the target attribute of the first object.

In the technical solution provided in S206, when it is determined that the target operation triggered by using the client is completed before the attribute value of the target attribute drops to the second threshold, the terminal restores the attribute value of the life attribute of the first object to the third threshold.

Optionally, when it is determined that the target operation triggered by using the client is completed before the attribute value of the target attribute drops to the second threshold, the restoring the attribute value of the life attribute of the first object to the third threshold may be implemented in the following manner S2041-S2042:

S2041: Detect an operation triggered by using the client.

Optionally, it may be determined whether the operation triggered by using the client is the target operation in the following manner: determining that the operation triggered by using the client is the target operation when it is determined that the operation triggered by using the client is an operation that is triggered in an interface of the client and that is indicated by the target attribute, for example, a quick click operation of the player on the game client, in which the player may control the first object through the client.

During or after the detecting an operation triggered by using the client (that is, S2041), feedback is provided on the client for the target operation when it is determined that the operation triggered by using the client is an operation that is triggered in the interface of the client and that is indicated by the target attribute. The providing feedback on the client for the target operation may include at least one of the following: playing a feedback screen corresponding to the target operation on the client; playing a feedback sound corresponding to the target operation on the client; and vibrating in a vibration manner corresponding to the target operation.

Optionally, it may be further determined whether the operation triggered by using the client is the target operation in the following manner: determining that the operation triggered by using the client is the target operation when it is determined that the operation triggered by using the client is an attack operation of the first object on a second object in the virtual scene, where the second object is different from the first object, for example, the second object is an enemy of the first object.

Optionally, a screen of performing the attack operation by the first object on the second object is played on the client when it is determined that the operation triggered by using the client is the attack operation of the first object on the second object in the virtual scene. For example, a screen of performing a shooting operation by the first object on the second object is played.

S2042: Restore the attribute value of the life attribute of the first object to the third threshold when it is determined that the operation triggered by using the client is the target operation and the target operation triggered by using the client is completed before the attribute value of the target attribute drops to the second threshold.

Optionally, when it is determined that the target operation triggered by using the client is completed before the attribute value of the target attribute drops to the second threshold, in order to show that the first object succeeds in autonomous survival, a screen in which the first object returns to the first posture from the second posture is played on the client. For example, a screen of the first object standing up is played.

Optionally, when it is determined that the target operation triggered by using the client is completed before the attribute value of the target attribute drops to the second threshold, the corresponding restrictions may be further released to: restore the movable area of the first object to all sub-areas in the target area; and/or restore the executable action of the first object to all actions in the action set; and/or restore the usable item of the first object to all items in the item set.

Optionally, after the controlling an attribute value of a target attribute of the first object to start to decrease, when the target operation is still not triggered by the client until the attribute value of the target attribute drops to the second threshold, or when it is determined that the target operation triggered by using the client is completed after the attribute value of the target attribute drops to the second threshold, the first object is controlled to enter a death state or a respawning state.

According to the technical solution in this embodiment of the disclosure, an impending death state is added between a battle state in growth and a death state of an object such as a character, and then a variety of gameplay is provided in a phase of the impending death state, to increase the fun, immersiveness, and operability of the game and the character. The gameplay in the impending death phase may change the state of the character. If an operation is performed properly, the character may be respawned without death, to continue to join a battle, such as a transition from a falling-to-ground state to being respawned after killing an enemy; or a transition from a falling-to-ground state to being respawned through a QTE operation by clicking/tapping a screen.

In an optional embodiment, a shooting game is used as an example below to further describe the implementation solution of the disclosure in detail.

In the shooting game, after an amount of health (the attribute value of the life attribute) is fully depleted, some characters (equivalent to the first object) temporarily do not enter a death state, but enter an impending death state, with an animation showing that the character falls to the ground. In this process, different characters may each have different gameplay, and players may avoid death of the characters through the corresponding gameplay.

Gameplay solutions according to example embodiments of the disclosure are described in detail below.

Figure 3:
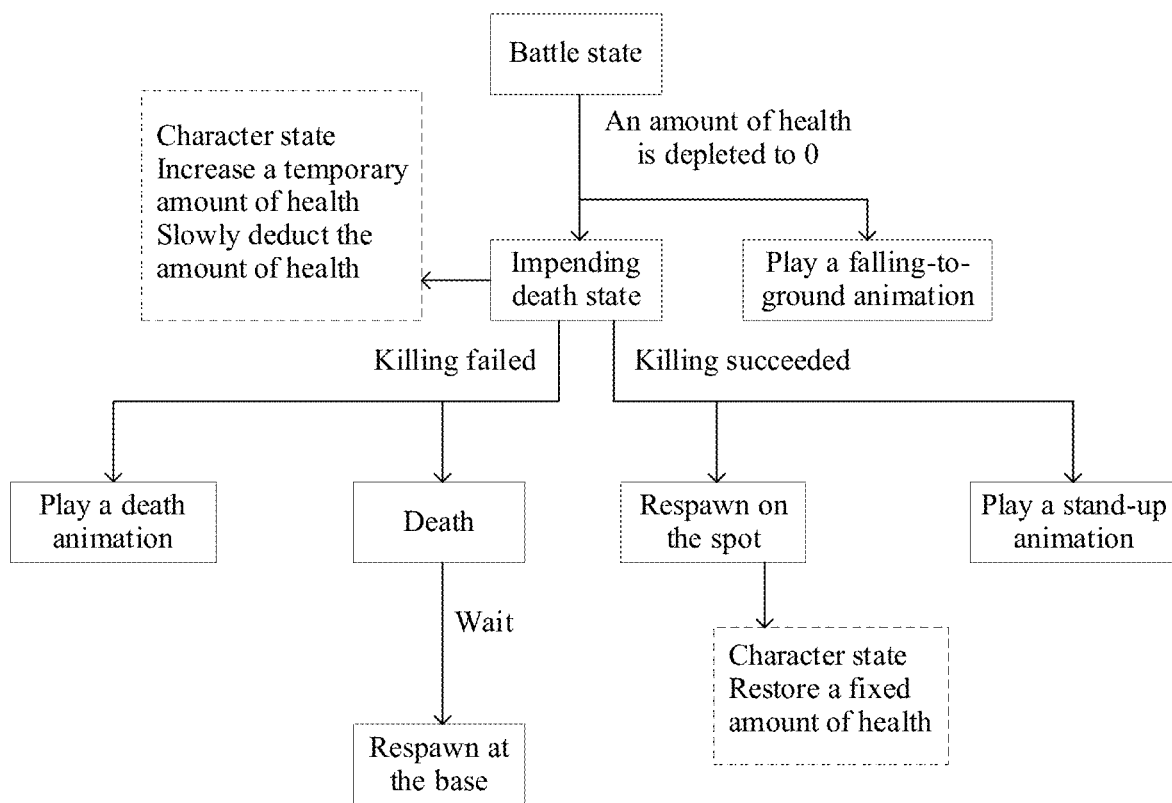
FIG. 3 is a schematic diagram of optional respawning in an impending death state according to an embodiment of the disclosure.

In an example, killing an enemy is triggered to respawn. In the game, if a character is knocked out, that is, a player is knocked down from a normal battle state, the character is caused to enter an impending death state. After entering a falling-to-ground state, the player character may stand up, that is, respawn, by killing the enemy. FIG. 3 is a diagram showing that a character in an impending death state respawns by killing an enemy.

In FIG. 3, the character is in a battle state. The battle state is a process in which a player interacts with another character in a game. In this process, behavior causing a decrease in an amount of health may occur. For example, in a shooting game, a character is in the battle state most of the time.

The amount of health is depleted to zero by the enemy. If a fixed amount of health of a character decreases to zero, a certain character may die immediately and then wait for respawning, and another character may enter the impending death state. The player character enters the impending death state. When the character enters the impending death state, a falling-to-ground animation is played for the character. The character instantaneously has a temporary amount of health (e.g., with the same value as the original fixed amount of health or a value less than the original fixed amount of health), and the temporary amount of health may be automatically deducted from time to time (e.g., at time intervals). If the character in the current phase (that is, a phase in which the temporary amount of health decreases) does not complete the operation of "killing an enemy", the character dies.

In the falling-to-ground state, the character body cannot move but may only lie on the spot (this may be part of the gameplay), and only movement of a perspective may be controlled to find an enemy. In addition, in this process, the movement of the perspective does not change a character orientation and a character skeleton. This may be implemented through animation fusion.

In this process, the following manner may be used to highlight that the player character enters the impending death state: A video camera swings and tilts slightly, to restore the falling-to-ground state as much as possible. Content displayed on a screen is post-processed to make the screen become red, simulating the impending death state. When an enemy hits the character, the video camera vibrates accordingly. If an enemy attacks the character in the impending death state at this time, deduction of the temporary amount of health is accelerated.

If the enemy is successfully defeated before the temporary amount of health is fully deducted, an animation of the character standing up is played. Then the character respawns on the spot, and the character state is restored to the fixed amount of health. In this case, the temporary amount of health disappears, and the fixed amount of health returns to full value. If the enemy is not successfully defeated before the temporary amount of health is fully deducted, a death animation (or a scene corresponding to a death) of the character is played. Then the character enters a death state. The character enters a waiting state, and then returns to the base for respawning.

The foregoing solution of killing an enemy to respawn is a process of changing from the battle state to the impending death state and then to the respawning state, and technically, may be implemented by a skill state machine (the kill state machine is a procedure frame used for controlling skills) and a character state machine (the character state machine is a procedure frame used for controlling a character state) jointly.

Figure 4:
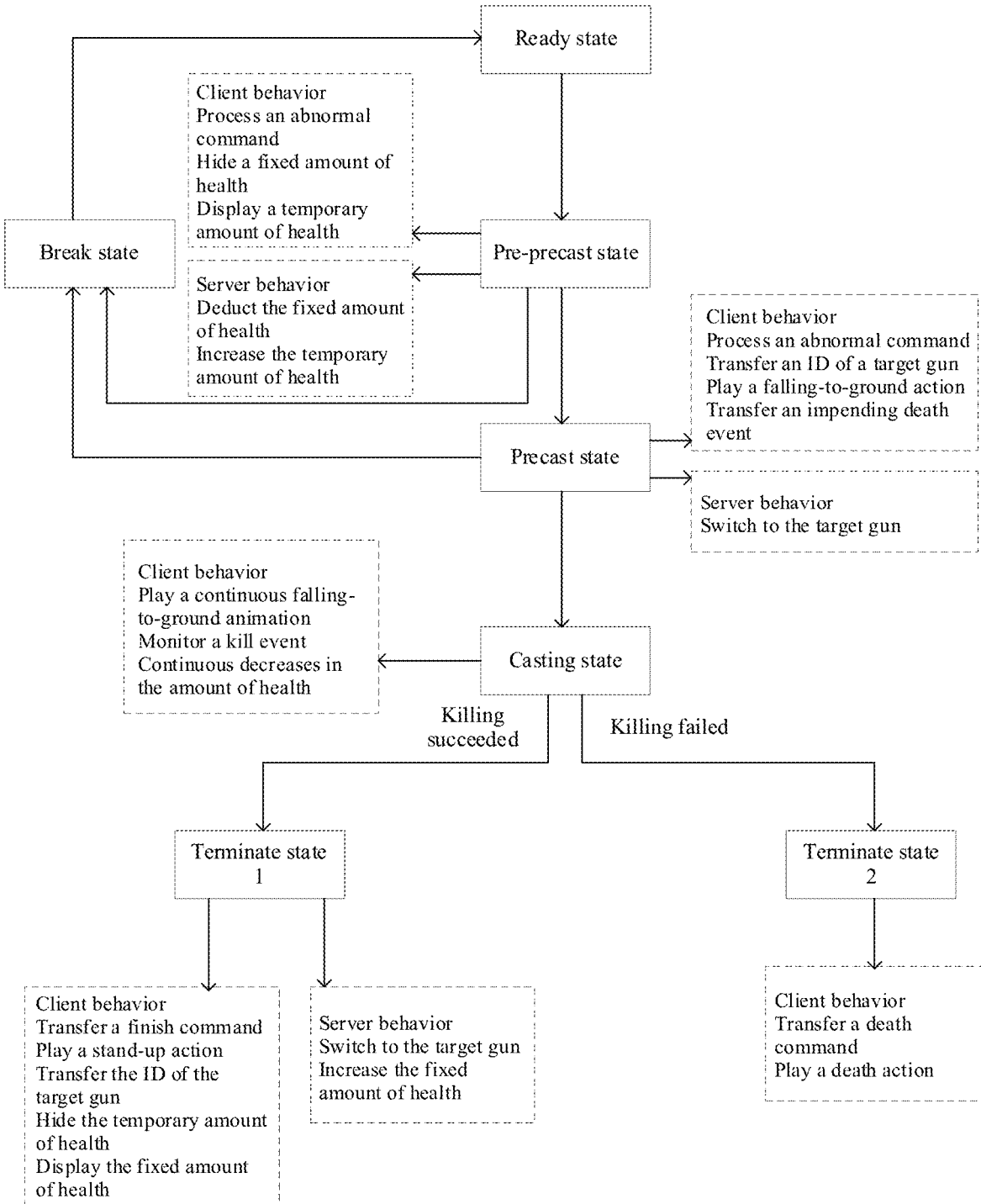
FIG. 4 is a schematic diagram of optional respawning in an impending death state according to an embodiment of the disclosure.

The skill state machine is described in detail with reference to FIG. 4:

The character state machines changes states with events transmitted from the skill state machine. When monitoring a "kill" event, the skill state machine transfers a "finish" event to the character state machine. After receiving this event ("finish" event), the character state machine causes the character to return to an "idle" state, that is, a normal state, from the impending death state.

There may be four phases for a state machine in a normal procedure: a ready state, a precast state, a casting state, and a terminate state.

Optionally, there may be further a break state that prevents an abnormal case from terminating the skill early. If there is no abnormal case, this state may not be entered. A pre-precast state may be further included.

Ready state: When this skill is not used, the skill state machine stays in the ready state. In this case, the client prepares the state of the skill so that the skill is in a state that is ready to use, that is, a state in which a death event is not triggered (that is, the attribute value has not fallen to the first threshold). For example, the obtaining the current attribute value of the life attribute of the first object in the virtual scene in S202 may be in this state.

Pre-precast state: When the character triggers the death event, the skill state machine automatically switches to the pre-precast state from the ready state. This phase is mainly used for building an "impending death" environment for the character. First, the fixed amount of health is replaced with the temporary amount of health. In this phase, client behaviors include: receiving and processing various abnormal commands (e.g., commands corresponding to an abnormal situation), hiding a health bar of the fixed amount of health, and displaying a health bar of the temporary amount of health. Server behaviors include: fully deducting the fixed amount of health, and increasing the temporary amount of health by a value equal to an upper limit value of the second range (e.g., an upper limit value of the fixed amount of health or less). After this phase times out, a next state is automatically entered. For example, the "controlling the attribute value of the target attribute of the first object to become effective (that is, replacing the fixed amount of health with the temporary amount of health) when the current attribute value is the first threshold" in S204 belongs to this state.

Precast state: In this phase, the client plays an action of falling to the ground, receives a gun-changing command according to the gameplay of "changing guns in the impending death state", and transfers an ID of a target gun to the server. After receiving the ID of the target gun, the server causes the character to switch a gun to another weapon (corresponding to the foregoing description of "sending an item identifier of a first item to a server before the detecting an operation triggered by using the client, where the server switches an item currently used by the first object to the first item according to the received item identifier", where the first item may be the ID of the target gun), to meet a gameplay requirement of the character. In this phase, the skill state machine transfers an "impending death" command to the character state machine, to cause the character state machine to change from the "idle" state to the "impending death" state, that is, change from the normal state of the character to the impending death state. In this phase, client behaviors include: receiving and processing various abnormal commands, receiving a gun-changing command, transferring an ID of a target gun to the server, playing a falling-to-ground animation (corresponding to the foregoing description of "playing, on the client, a screen in which the first object switches from a first posture to a second posture, where the first posture is a posture of the first object before the attribute value of the life attribute drops to the first threshold, and the second posture is a state corresponding to a case that the attribute value of the life attribute is the first threshold", where the first posture may be a posture before falling to the ground, and the second posture may be a posture after falling to the ground), and transferring an "impending death" event to the character state machine. Server behaviors include: receiving the ID of the target gun to change a current gun to the target gun.

Casting state: In this phase, the client may play an action of falling to the ground. For example, a video camera swings and tilts to restore an impending death effect. Optionally, at the same time, the client transfers, to the server, a buff ID of an effect of deducting the amount of health. After receiving the ID, the server continuously deducts the temporary amount of health. Most importantly, in this phase, the client monitors an event named "kill" (that is, a kill event, corresponding to the target operation triggered by using the client in S206, where this target operation may be a kill event). If the character kills the enemy in this phase, the client transfers this event to the server. When the server receives this event (that is, "kill" event), it is considered that the character has completed the corresponding gameplay, and some rewards may be given, that is, the character is respawned (equivalent to restoring the attribute value of the life attribute of the first object to the third threshold when the target operation triggered by using the client is completed before the attribute value of the target attribute drops to the second threshold in S206, where restoring a value of the life attribute is equivalent to respawning). If the character does not kill the enemy in this phase (equivalent to a case in which the target operation is still not successfully triggered by the client until the attribute value of the target attribute drops to the second threshold), and has not completed the corresponding gameplay when the temporary amount of health is fully deducted, the client transfers a "death" event to the server. After receiving this event, the server causes the character to enter the death state. In this phase, client behaviors include: playing a continuous animation (or scene) of a falling-to-ground phase, monitoring the kill event, and enhancing an effect of continuous decreases in the amount of health.

Terminate state: There are two terminate states: termination after respawning after killing is completed (a terminate state 1) and termination after death without completing killing (a terminate state 2).

Terminate state 1: In case of termination after killing is completed, in this phase, client behaviors include: transferring a "finish" command to the character state machine, to cause the character state machine to return to the "idle" state (that is, a state after the attribute value of the life attribute of the first object is restored), where at the same time, in the skill state machine, the client may play a stand-up action (corresponding to the first posture of the character restored to normal from the second posture); receiving a gun-changing command, and providing an ID of a target gun in the normal state to the server, to cause the server to switch back to a normal gun (corresponding to "sending, to the server, an item identifier of a second item used by the first object after switching of the first item, when the target operation is completed before the attribute value of the target attribute drops to the second threshold, where the server switches a currently used item to the second item according to the received item identifier"); clearing a buff of decreasing the amount of health, eliminating the temporary amount of health, and hiding a health bar of an amount of health in the impending death state; and restoring the fixed amount of health to full value, and displaying a health bar of the fixed amount of health in the normal state.

Terminate state 2: In a case of termination after death without completing killing (corresponding to controlling the first object to enter the death state), in this phase, client behaviors include: transferring, by the client, a "death" command to the character state machine, to cause the character state machine to enter the "death" state and the character to die; and at the same time, playing a death animation (or a scene corresponding to a character death).

Figure 5:
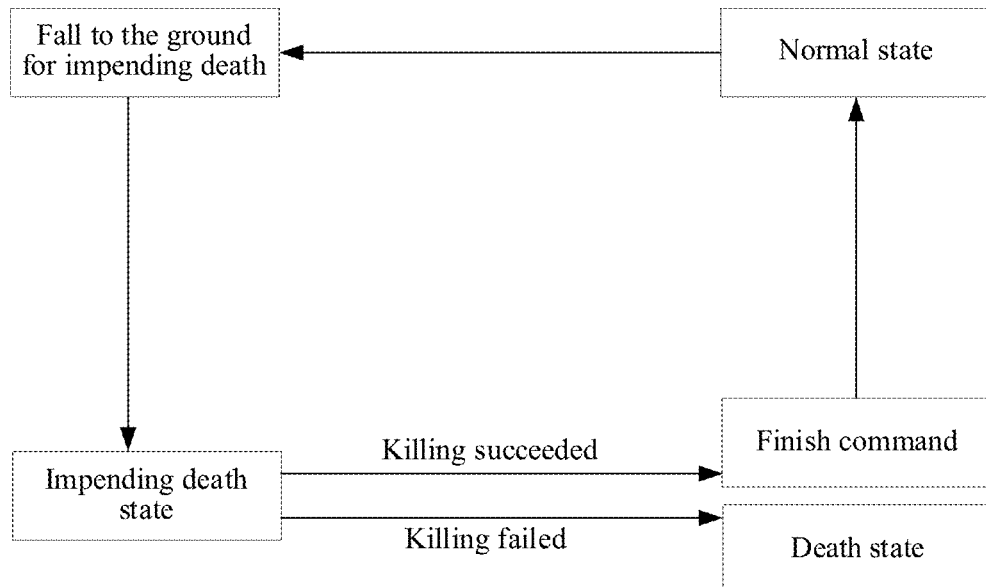
FIG. 5 is a schematic diagram of an optional character state machine according to an embodiment of the disclosure.

A diagram of the character state machine is shown in FIG. 5:

Idle state: In this case, the character may perform a normal game operation such as killing. After being killed, the character falls to the ground for impending death, and enters the "impending death" state. If the enemy is successfully killed, the skill state machine transmits a "finish" command, to restore the idle state. If the enemy is not killed, the skill state machine transmits a "death" command, and the character enters the "death" state.

Figure 6:
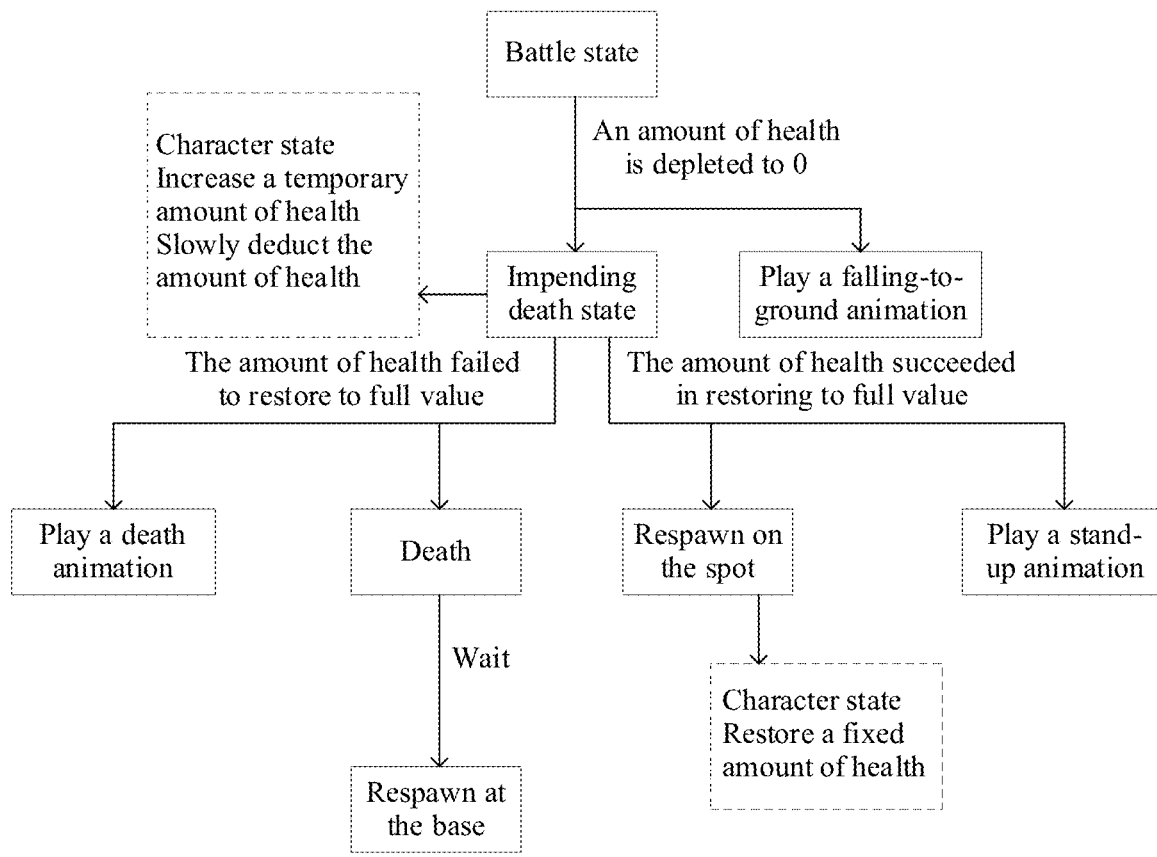
FIG. 6 is a schematic diagram of optional respawning in an impending death state according to an embodiment of the disclosure.

A QTE operation is performed for respawning. In the game, if a character enters the falling-to-ground state, a QTE operation on the screen may be quickly clicked/tapped to cause the character to stand up, that is, respawn. A diagram for explaining respawning is shown in FIG. 6.

Figure 7A:
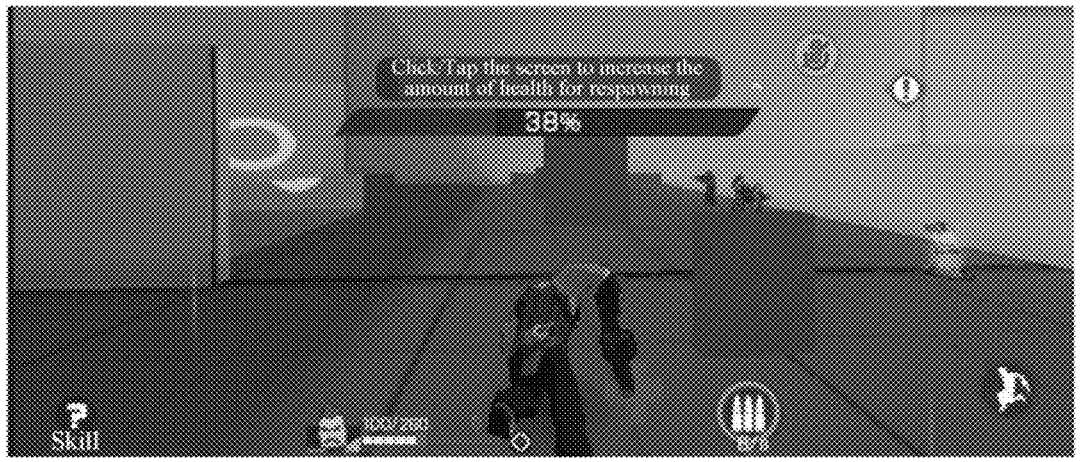
FIG. 7a is a schematic diagram of an optional impending death state according to an embodiment of the disclosure.
Figure 7B:
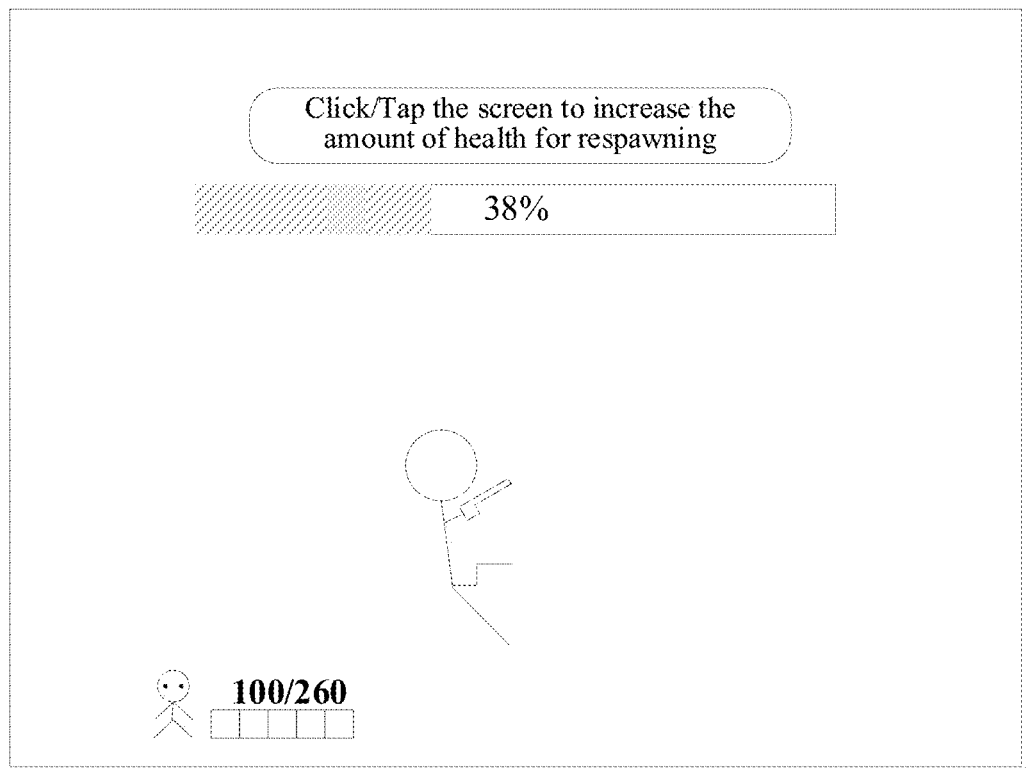

Before entering the impending death state, this character is operated in the same way as other characters. However, in the impending death state, the character is immediately switched to a third person after entering the impending death state, as shown in FIG. 7a and FIG. 7b.

The character still has a temporary amount of health that is continuously deducted over time in the impending death state. However, the temporary amount of health of the character may be less (e.g., half) of an upper limit value of the fixed amount of health, and the remaining portion (or remaining half) needs to be obtained by the player through the Q operation. In addition, the player cannot control the character at this time, and the character may maintain a certain posture (e.g., kneeling posture) only.

Figure 8A:
FIG. 8a is a schematic diagram of optional respawning according to an embodiment of the disclosure.
Figure 8B:
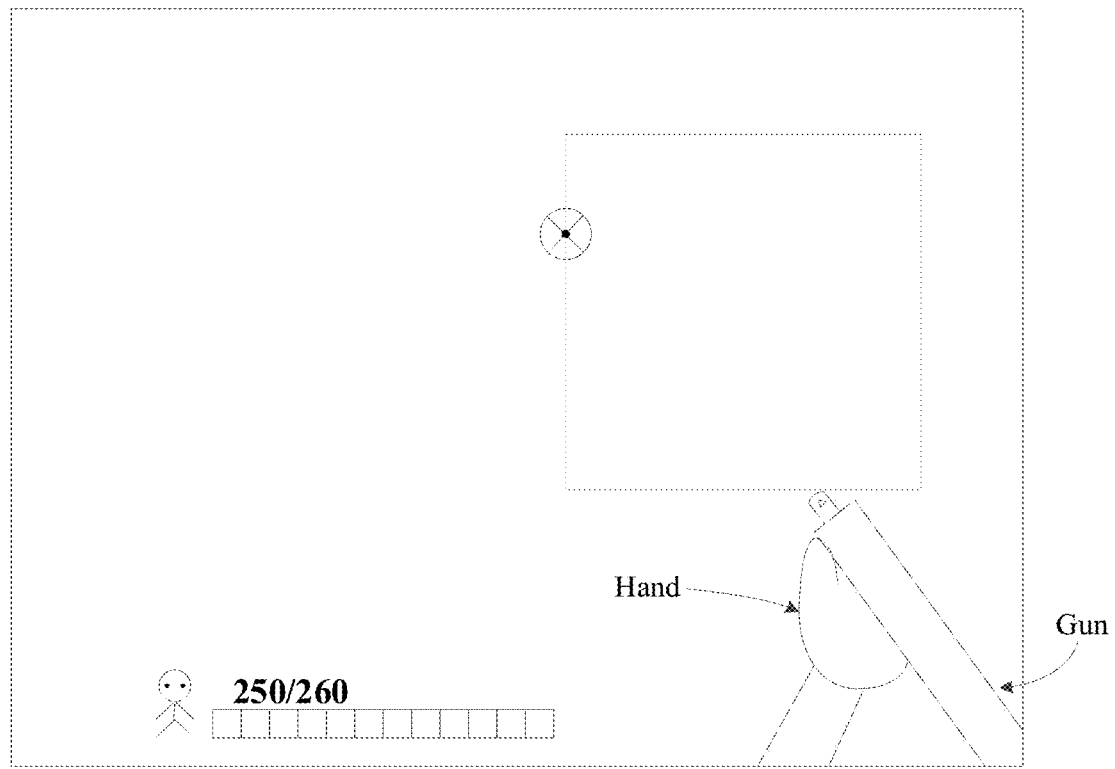

In this phase, the player may increase the amount of health by quickly clicking/tapping the screen, until the health bar (e.g., a bar indicating temporary health or a health bar for respawning) is full, and each click/tap may be accompanied with vibration of the video camera. However, if an enemy attacks the character in the impending death state at this time, deduction of the temporary amount of health is accelerated. After the health bar is full, that is, the amount of health is successfully restored, an action of standing up is played for the character, the character is switched to a first person, as shown in FIG. 8a and FIG. 8b, and the fixed amount of health is restored to the full value. In this way, the player regains control of the character. If the amount of health cannot be restored to the full value, the character dies, and a death animation (or a scene corresponding to a character death) is played.

A procedure of respawning through the QTE operation may be similar to the procedure of respawning by killing an enemy. A difference is that in the casting phase of the skill state machine, the client does not monitor a "kill" event, but monitor an event named "recovery". That is, when the client monitors that the temporary amount of health is restored to the full value, the client transfers a "finish" event to the character state machine. After receiving this event, the character state machine causes the character to return from the impending death state to the "idle" state, that is, the normal state.

Respawning by killing an enemy and respawning through the QTE operation are used above as an example for description. In an example implementation, more gameplay may be used in the impending death state, and/or more other states (or events) may be added. For example, gameplay may be created in a period after death of the character and before respawning of the character.

In the technical solution of the disclosure, the player may perform special gameplay such as shooting or a QTE in the impending death state, to avoid death, and to be respawned. In addition, in this process, the special gameplay may bring fun, positive feedback and enhanced immersiveness to the player, and free the player from various negative feedback caused by helplessness in the impending death state.

For ease of description, the foregoing method embodiments are stated as a combination of a series of actions. However, a person skilled in the art would understand that the disclosure is not limited by the described action sequence, because according to the disclosure, some operations may be performed in another sequence or simultaneously. In addition, a person skilled in the art would understand that the embodiments described in this specification are all example embodiments, and the involved actions and modules are not necessarily required by the disclosure.

According to the descriptions in the foregoing implementations, a person skilled in the art would clearly understand that the method(s) according to the foregoing embodiment may be implemented by software with a necessary universal hardware platform, or by using hardware. Based on such an understanding, the technical solutions of the disclosure may be at least partially implemented in the form of a software product. The computer software product is stored in a storage medium (such as a read-only memory (ROM)/ random access memory (RAM), a magnetic disk, or an optical disc), and includes instructions for instructing a terminal device (which may be a mobile phone, a computer, a server, a network device, or the like) to perform the method described in the embodiments of the disclosure.

Figure 9:
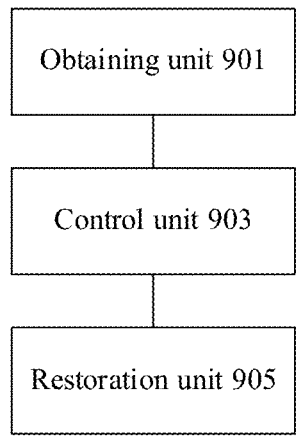
FIG. 9 is a schematic diagram of an optional attribute value restoration apparatus according to an embodiment of the disclosure.

According to another aspect of the embodiments of the disclosure, an attribute value restoration apparatus used for implementing the foregoing attribute value restoration method is further provided. FIG. 9 is a schematic diagram of an optional attribute value restoration apparatus according to an embodiment of the disclosure. As shown in FIG. 9, the apparatus may include an obtaining unit 901, a control unit 903, and a restoration unit 905.

The obtaining unit 901 is configured to obtain a current attribute value of a life attribute of a first object in a virtual scene displayed by a client.

The control unit 903 is configured to control an attribute value of a target attribute of the first object to start to decrease in a second range (when the target attribute becomes effective, a value of the target attribute may fall within a range (that is, the second range)) when the current attribute value is a first threshold, the target attribute being used for instructing to restore an attribute value of the life attribute by triggering a target operation by using the client.

The restoration unit 905 is configured to restore the attribute value of the life attribute of the first object to a third threshold when it is determined that the target operation triggered by using the client is completed before the attribute value of the target attribute in the second range drops to a second threshold, the third threshold being greater than the first threshold.

The obtaining unit 901 in this embodiment may be configured to perform S202 in the embodiments of the disclosure. The control unit 903 in this embodiment may be configured to perform S204 in the embodiments of the disclosure. The restoration unit 905 in this embodiment may be configured to perform S206 in the embodiments of the disclosure.

Examples implemented by the foregoing modules and corresponding operations and application scenarios of the foregoing modules and corresponding operations are the same, are not limited to the content disclosed in the foregoing embodiments. The foregoing modules may be run in the hardware environment shown in FIG. 1 as a part of the apparatus, and may be implemented by software, or may be implemented by hardware.

According to the foregoing modules, when the current attribute value is the first threshold, a terminal controls the attribute value of the target attribute of the first object to start to decrease in the second range, that is, the first object enters the impending death state. Before the attribute value of the target attribute drops to the second threshold, if detecting the target operation triggered by the client, the terminal restores the attribute value of the life attribute of the first object to the third threshold, that is, completes the respawning of the first object. This resolves a technical problem in the related art technology that an object is respawned in a relatively undiversified manner, thereby achieving a technical effect of respawning the object while enriching the gameplay of the user.

Optionally, the restoration unit may include: a detection module, configured to detect an operation triggered by using the client; and a restoration module, configured to restore the attribute value of the life attribute of the first object to the third threshold when it is determined that the operation triggered by using the client is the target operation, and it is determined that the target operation triggered by using the client is completed before the attribute value of the target attribute drops to the second threshold.

Optionally, the detection module determines, in the following manner, whether the operation triggered by using the client is the target operation: determining that the operation triggered by using the client is the target operation when it is determined that the operation triggered by using the client is an operation that is triggered in an interface of the client and that is indicated by the target attribute; and/or determining that the operation triggered by using the client is the target operation when it is determined that the operation triggered by using the client is an attack operation of the first object on a second object in the virtual scene, the second object being different from the first object.

Optionally, the apparatus may further include: a feedback unit, configured to provide feedback on the client for the target operation when it is determined that the operation triggered by using the client is an operation that is triggered in the interface of the client and that is indicated by the target attribute.

That the feedback unit provides feedback on the client for the target operation includes at least one of the following: playing a feedback screen corresponding to the target operation on the client; playing a feedback sound corresponding to the target operation on the client; and vibrating in a vibration manner corresponding to the target operation.

Optionally, the apparatus further may include: a playing unit, configured to play, on the client, a screen of performing the attack operation by the first object on the second object when it is determined that the operation triggered by using the client is the attack operation of the first object on the second object in the virtual scene.

Optionally, the playing unit is further configured to: when the current attribute value is the first threshold, play, on the client, a screen in which the first object switches from a first posture to a second posture, where the first posture is a posture of the first object before the attribute value of the life attribute drops to the first threshold, and the second posture is a state corresponding to a case that the attribute value of the life attribute is the first threshold.

Optionally, the playing unit is further configured to: when it is determined that the target operation triggered by using the client is completed before the attribute value of the target attribute drops to the second threshold, play, on the client, a screen in which the first object returns to the first posture from the second posture.

Optionally, the control unit may be configured to: decrease the attribute value of the target attribute of the first object once every time period; and/or decrease, when an attack operation of a third object on the first object in the virtual scene is detected, the attribute value of the target attribute of the first object according to the attack operation.

Optionally, the apparatus may further include: a restriction unit, configured to perform at least one of the following when the current attribute value is the first threshold: setting a movable area of the first object to a target sub-area in a target area, where the target area is an area in which the first object is allowed to move in the virtual scene before the attribute value of the life attribute drops to the first threshold, and the target sub-area is a sub-area in which the first object is currently located in the target area; setting an executable action of the first object to a target action in an action set, where an action in the action set is an action that the first object is allowed to execute before the attribute value of the life attribute drops to the first threshold, and the target action is an action that is included (or a subset) in the action set and that the first object is allowed to execute when the attribute value of the life attribute is the first threshold; and setting a usable item of the first object to a target item in an item set, where an item in the item set is an item that the first object is allowed to use before the attribute value of the life attribute drops to the first threshold, and the target item is an item that is included (or a subset) in the item set and that the first object is allowed to use when the attribute value of the life attribute is the first threshold.

Optionally, the apparatus may further include: a restriction releasing unit, configured to perform at least one of the following when it is determined that the target operation triggered by using the client is completed before the attribute value of the target attribute drops to the second threshold: restoring the movable area of the first object to all sub-areas in the target area; restoring the executable action of the first object to all actions in the action set; and restoring the usable item of the first object to all items in the item set.

Optionally, the control unit may be further configured to: after controlling the attribute value of the target attribute of the first object to start to decrease in the second range, control the first object to enter a death state when the target operation is still not triggered by the client when the attribute value of the target attribute drops to the second threshold, or control the first object to enter a respawning state when the target operation triggered by using the client is completed before the attribute value of the target attribute drops to the second threshold.

In the technical solution of the disclosure, the player may perform special gameplay such as shooting or a QTE in the impending death state, to avoid death, and to be respawned. In addition, in this process, the special gameplay may bring fun, positive feedback and enhanced immersiveness to the player, and free the player from various negative feedback caused by helplessness in the impending death state.

Examples implemented by the foregoing modules and corresponding operations and application scenarios of the foregoing modules and corresponding operations are the same, but are not limited to the content disclosed in the foregoing embodiments. The foregoing modules may be run in the hardware environment shown in FIG. 1 as a part of the apparatus, and may be implemented by software, or may be implemented by hardware. The hardware environment includes a network environment.

According to another aspect of the embodiments of the disclosure, a server or terminal used for implementing the foregoing attribute value restoration method is further provided.

Figure 10:
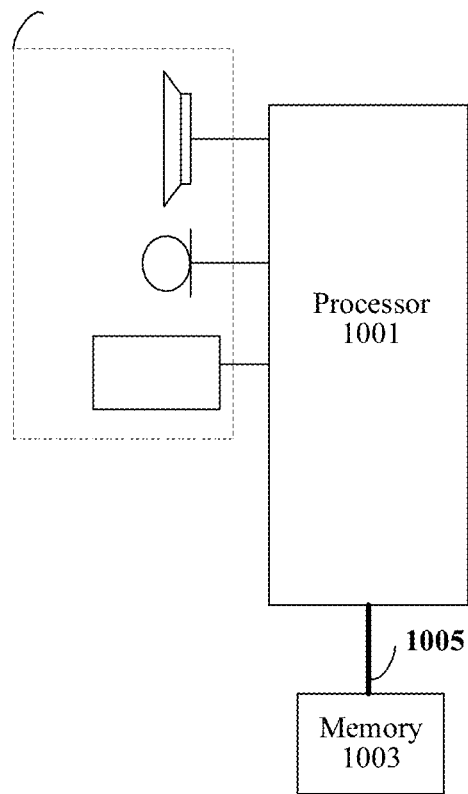
FIG. 10 is a structural block diagram of a terminal according to an embodiment of the disclosure.

FIG. 10 is a structural block diagram of a terminal according to an embodiment of the disclosure. As shown in FIG. 10, the terminal may include one or more processors 1001 (only one processor is shown in FIG. 10), a memory 1003, and a transmission apparatus 1005. As shown in FIG. 10, the terminal may further include an input/output device 1007.

The memory 1003 may be configured to store a software program and a module, for example, a program instruction/module corresponding to the attribute value restoration method and apparatus in the embodiments of the disclosure. The processor 1001 runs the software program and the module that are stored in the memory 1003, to perform various function applications and data processing, that is, implement the attribute value restoration method. The memory 1003 may include a high-speed random access memory, and may also include a non-volatile memory, for example, one or more magnetic storage apparatuses, a flash memory, or another non-volatile solid-state memory. In some embodiments, the memory 1003 may further include memories remotely disposed relative to the processor 1001, and the remote memories may be connected to a terminal through a network. Examples of the network include, but are not limited to, the Internet, an intranet, a local area network, a mobile communication network, and any combination thereof.

The transmission apparatus 1005 is configured to receive or send data by using a network, or may further be configured to transmit data between the processor and the memory. Specific examples of the foregoing network may include a wired network and a wireless network. In an example, the transmission apparatus 1005 includes a network interface controller (NIC). The NIC may be connected to another network device and a router by using a network cable, so as to communicate with the Internet or a local area network. In an example, the transmission apparatus 1005 is a radio frequency (RF) module, which communicates with the Internet in a wireless manner.

Specifically, the memory 1003 is configured to store an application.

The processor 1001 may invoke, by using the transmission apparatus 1005, the application stored in the memory 1003, to perform the following operations:

obtaining a current attribute value of a life attribute of a first object in a virtual scene displayed by a client;

controlling an attribute value of a target attribute of the first object to start to decrease when the current attribute value is a first threshold, the target attribute being used for instructing to restore an attribute value of the life attribute by triggering a target operation by using the client; and restoring the attribute value of the life attribute of the first object to a third threshold when it is determined that the target operation triggered by using the client is completed before the attribute value of the target attribute drops to a second threshold, the third threshold being greater than the first threshold.

The processor 1001 is further configured to perform the following operations:

setting a movable area of the first object to a target sub-area in a target area, where the target area is an area in which the first object is allowed to move in the virtual scene before the attribute value of the life attribute drops to the first threshold, and the target sub-area is a sub-area in which the first object is currently located in the target area;

setting an executable action of the first object to a target action in an action set, where an action in the action set is an action that the first object is allowed to execute before the attribute value of the life attribute drops to the first threshold, and the target action is an action that is included (or a subset) in the action set and that the first object is allowed to execute when the attribute value of the life attribute is the first threshold; and setting a usable item of the first object to a target item in an item set, where an item in the item set is an item that the first object is allowed to use before the attribute value of the life attribute drops to the first threshold, and the target item is an item that is included (or a subset) in the item set and that the first object is allowed to use when the attribute value of the life attribute is the first threshold.

The processor 1001 is further configured to perform the following operations:

providing feedback on the client for the target operation when it is determined that the operation triggered by using the client is an operation that is triggered in the interface of the client and that is indicated by the target attribute.

The processor 1001 is further configured to perform the following operations:

playing, on the client, a screen of performing the attack operation by the first object on the second object when it is determined that the operation triggered by using the client is the attack operation of the first object on the second object in the virtual scene.

The processor 1001 is further configured to perform the following operations:

sending an item identifier of a first item to a server before the detecting an operation triggered by using the client, where the server is configured to switch an item currently used by the first object to the first item according to the received item identifier; and/or sending, to the server, an item identifier of a second item used by the first object after switching of the first item, when it is determined that the target operation triggered by using the client is completed before the attribute value of the target attribute drops to the second threshold, where the server is configured to switch a currently used item to the second item according to the received item identifier.

The processor 1001 is further configured to perform the following operations:

when the current attribute value is the first threshold, playing, on the client, a screen in which the first object switches from a first posture to a second posture, where the first posture is a posture of the first object before the attribute value of the life attribute drops to the first threshold, and the second posture is a state corresponding to a case that the attribute value of the life attribute is the first threshold.

The processor 1001 is further configured to perform the following operations:

when it is determined that the target operation triggered by using the client is completed before the attribute value of the target attribute drops to the second threshold, playing, on the client, a screen in which the first object returns to the first posture from the second posture.

The processor 1001 is further configured to perform the following operations:

restoring the movable area of the first object to all sub-areas in the target area;

restoring the executable action of the first object to all actions in the action set; and restoring the usable item of the first object to all items in the item set.

The processor 1001 is further configured to perform the following operations:

when the target operation is still not triggered by the client when it is determined that the attribute value of the target attribute drops to the second threshold, or when it is determined that the target operation triggered by using the client is completed after the attribute value of the target attribute drops to the second threshold, controlling the first object to enter a death state or a respawning state.

According to this embodiment of the disclosure, when a current attribute value is a first threshold, a terminal controls an attribute value of a target attribute of a first object to start to decrease, the target attribute being used for instructing to restore an attribute value of the life attribute by triggering a target operation by using the client; and the terminal restores the attribute value of the life attribute of the first object to a third threshold when the target operation triggered by using the client is completed before the attribute value of the target attribute drops to a second threshold, thereby resolving a technical problem in the related art technology that an object is respawned in a relatively undiversified manner, and achieving a technical effect of respawning the object while enriching the gameplay of the user.

Optionally, for a specific example in this embodiment, examples described in the foregoing embodiments may be referred to, and details are not described in this embodiment again.

A person of ordinary skill in the art would understand that, the structure shown in FIG. 10 is only an example. The terminal may be a terminal device such as a smartphone (such as an Android mobile phone or an iOS mobile phone), a tablet computer, a palmtop computer, a mobile Internet device (MID), or a PAD. FIG. 10 does not limit the structure of the electronic device. For example, the terminal may further include more or fewer components (such as a network interface and a display apparatus) than those shown in FIG. 10, or may have a configuration different from that shown in FIG. 10.

A person of ordinary skill in the art would understand that all or some of the operations of the methods in the foregoing embodiments may be implemented by a program instructing relevant hardware of the terminal device. The program may be stored in a computer-readable storage medium. The storage medium may include a flash disk, a ROM, a RAM, a magnetic disk, an optical disc, and the like.

The embodiments of the disclosure further provide a storage medium. Optionally, in this embodiment, the storage medium may be configured to execute program code of the attribute value restoration method.

Optionally, in this embodiment, the storage medium may be located in at least one of a plurality of network devices in a network shown in the foregoing embodiment.

Optionally, in this embodiment, the storage medium is configured to store program code used for performing the following operations:

obtaining a current attribute value of a life attribute of a first object in a virtual scene displayed by a client;

when the current attribute value is a first threshold, controlling an attribute value of a target attribute of the first object to fall within the second range and start to decrease in the second range, the target attribute being used for instructing to restore an attribute value of the life attribute by triggering a target operation by using the client; and restoring the attribute value of the life attribute of the first object to a third threshold when it is determined that the target operation triggered by using the client is completed before the attribute value of the target attribute drops to a second threshold, the third threshold being greater than the first threshold.

Optionally, the storage medium is further configured to store program code used for performing the following operations:

setting a movable area of the first object to a target sub-area in a target area, where the target area is an area in which the first object is allowed to move in the virtual scene before the attribute value of the life attribute drops to the first threshold, and the target sub-area is a sub-area in which the first object is currently located in the target area;

setting an executable action of the first object to a target action in an action set, where an action in the action set is an action that the first object is allowed to execute before the attribute value of the life attribute drops to the first threshold, and the target action is an action that is included in the action set and that the first object is allowed to execute when the attribute value of the life attribute is the first threshold; and setting a usable item of the first object to a target item in an item set, where an item in the item set is an item that the first object is allowed to use before the attribute value of the life attribute drops to the first threshold, and the target item is an item that is included in the item set and that the first object is allowed to use when the attribute value of the life attribute is the first threshold.

Optionally, the storage medium is further configured to store program code used for performing the following operations:

providing feedback on the client for the target operation when it is determined that the operation triggered by using the client is an operation that is triggered in the interface of the client and that is indicated by the target attribute.

The processor 1001 is further configured to perform the following operations:

playing, on the client, a screen of performing the attack operation by the first object on the second object when it is determined that the operation triggered by using the client is the attack operation of the first object on the second object in the virtual scene.

Optionally, the storage medium is further configured to store program code used for performing the following operations:

sending an item identifier of a first item to a server before the detecting an operation triggered by using the client, where the server is configured to switch an item currently used by the first object to the first item according to the received item identifier; and/or sending, to the server, an item identifier of a second item used by the first object after switching of the first item, when it is determined that the target operation triggered by using the client is completed before the attribute value of the target attribute drops to the second threshold, where the server is configured to switch a currently used item to the second item according to the received item identifier.

Optionally, the storage medium is further configured to store program code used to perform the following operations:

when the current attribute value is the first threshold, playing, on the client, a screen in which the first object switches from a first posture to a second posture, where the first posture is a posture of the first object before the attribute value of the life attribute drops to the first threshold, and the second posture is a state corresponding to a case that the attribute value of the life attribute is the first threshold.

Optionally, the storage medium is further configured to store program code used to perform the following operations:

when it is determined that the target operation triggered by using the client is completed before the attribute value of the target attribute drops to the second threshold, playing, on the client, a screen in which the first object returns to the first posture from the second posture.

Optionally, the storage medium is further configured to store program code used to perform the following operations:

restoring the movable area of the first object to all sub-areas in the target area;

restoring the executable action of the first object to all actions in the action set; and restoring the usable item of the first object to all items in the item set.

Optionally, the storage medium is further configured to store program code used to perform the following operations:

when the target operation is still not triggered by the client when it is determined that the attribute value of the target attribute drops to the second threshold, or when it is determined that the target operation triggered by using the client is completed after the attribute value of the target attribute drops to the second threshold, controlling the first object to enter a death state or a respawning state.

Optionally, for a specific example in this embodiment, examples described in the foregoing embodiments may be referred to, and details are not described in this embodiment again.

Optionally, in this embodiment, the storage medium may include, but is not limited to, various media such as a USB flash drive, a ROM, a RAM, a removable hard disk, a magnetic disk, and an optical disc that may store the program code.

According to still another aspect of the embodiments of the disclosure, a computer program product is provided, the computer program product, when run on a computer, causing the computer to perform the operations according to any one of the foregoing method embodiments.

The sequence numbers of the foregoing embodiments of the disclosure are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of the disclosure may be at least partially, or all or some of the technical solutions may be implemented in a form of a software product. The computer software product is stored in a storage medium and includes instructions for instructing one or more computer devices (which may be a personal computer, a server, a network device, and the like) to perform all or some of the operations of the methods described in the embodiments of the disclosure.

In the foregoing embodiments of the disclosure, descriptions of the embodiments have respective focuses. As for parts that are not described in detail in one embodiment, reference may be made to the relevant descriptions of the other embodiments.

In the various example embodiments provided in the disclosure, it is to be understood that, the disclosed client may be implemented in another manner. The apparatus embodiments described above are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units may be integrated into one unit. The integrated unit may be implemented in a form of hardware, or may be implemented in a form of a software functional unit.

In the embodiments of the disclosure, when a current attribute value is a first threshold, a terminal controls an attribute value of a target attribute of a first object to start to decrease, that is, controls the first object to enter an impending death state; and before the attribute value of the target attribute drops to a second threshold, if a target operation triggered by a client is detected, the terminal restores the attribute value of a life attribute of the first object to a third threshold, that is, completes respawning of the first object, thereby resolving a technical problem in the related art technology that an object is respawned in a relatively undiversified manner, and achieving a technical effect of respawning the object while enriching the gameplay of the user.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While the disclosure has been particularly shown and described with reference to example embodiments thereof, it will be understood that various changes in form and details may be made therein without departing from the spirit and scope of the following claims.

What is claimed is:

1. An attribute value restoration method, performed by at least one processor of an electronic device, the method comprising:
   obtaining, with respect to a virtual scene of an application executed on a client, a current attribute value of a life attribute of a first object in the virtual scene displayed by the client;
   based on a determination that the current attribute value is a first threshold, controlling a preset process to begin, wherein the preset process comprises controlling an attribute value of a target attribute of the first object in a preset range until the attribute value decreases to a preset threshold; and
   restoring the attribute value of the life attribute of the first object to another threshold based on a determination that a target event is completed before the preset process is over, the another threshold being greater than the first threshold.

2. The method according to claim 1, wherein the preset process comprises:
   controlling the target attribute of the first object to become effective, the target attribute having the attribute value in the preset range;
   controlling the attribute value of the target attribute to start to decrease in the preset range; and
   determining the preset process is over when the attribute value of the target attribute decreases to a second another threshold.

3. The method according to claim 2, wherein the second another threshold is a lower limit of the preset range.

4. The method according to claim 3, wherein the second another threshold is zero.

5. The method according to claim 2, wherein the target attribute is time or temporary health.

6. The method according to claim 2, wherein the target event is a target operation triggered by the client,
   wherein an item currently used by the first object in completing the target operation is a first item, and the method further comprises:
   based on a determination that the target operation triggered by the client is completed before the attribute value of the target attribute decreases to the second another threshold, transmitting, to a server, an item identifier of a second item to be used by the first object after switching from the first item, the first item currently used being switched to the second item according to the item identifier of the second item transmitted to the server.

7. The method according to claim 2, further comprising, based on the determination that the current attribute value is the first threshold:
playing, on the client, a screen in which the first object switches from a first posture to a second posture, the second posture being different from the first posture.

8. The method according to claim 7, further comprising, based on the determination that the target event is completed before the attribute value of the target attribute decreases to the second another threshold:
playing, on the client, a screen in which the first object returns to the first posture from the second posture.

9. The method according to claim 2, wherein the controlling the attribute value of the target attribute of the first object to start to decrease in the preset range comprises:
decreasing the attribute value of the target attribute of the first object once every time period; and/or
decreasing, based on a detection of an attack operation of a third object on the first object in the virtual scene, the attribute value of the target attribute of the first object according to the attack operation.

10. The method according to claim 1, wherein the target event is a target operation triggered by the client.

11. The method according to claim 10, wherein the target operation triggered by the client is performed by the first object.

12. The method according to claim 11, wherein the target operation comprises:
an attack operation of the first object on a second object in the virtual scene, the second object being different from the first object.

13. The method according to claim 12, further comprising, during or after detecting the target operation:
playing, on the client, a screen of performing the attack operation by the first object on the second object based on a determination that the target operation is the attack operation of the first object on the second object in the virtual scene.

14. The method according to claim 10, wherein the target operation comprises:
an operation that is triggered in an interface of the client and that is indicated by a target attribute of the first object.

15. The method according to claim 14, wherein the operation that is triggered in the interface of the client includes at least one of a plurality of click operations or a plurality of tapping operations on the interface, each of which increases the current attribute value.

16. The method according to claim 14, further comprising, during or after detecting the target operation:
providing at least one of a visual feedback, an auditory feedback, or a vibration feedback corresponding to the target operation.

17. The method according to claim 1, further comprising:
transmitting an item identifier of a first item to a server before detecting the target event, an item previously used by the first object being switched to the first item according to the item identifier of the first item transmitted to the server.

18. The method according to claim 1, further comprising, based on the determination that the current attribute value is the first threshold, performing at least one of the following:
setting a movable area of the first object to a target sub-area in a target area, wherein the target area is an area in which the first object is allowed to move in the virtual scene before the attribute value of the life attribute decreases to the first threshold, and the target sub-area is a sub-area of the target area;
setting an executable action of the first object to a target action in an action set, wherein the action set comprises a plurality of actions that the first object is allowed to execute before the attribute value of the life attribute decreases to the first threshold, and the target action is a subset of the action set; and
setting a usable item of the first object to a target item in an item set, wherein the item set comprises a plurality of items that the first object is allowed to use before the attribute value of the life attribute decreases to the first threshold, and the target item is a subset of the item set.

19. An attribute value restoration apparatus, comprising:
at least one memory configured to store program code; and
at least one processor configured to read the program code and operate as instructed by the program code, the program code comprising:
obtaining code configured to cause at least one of the at least one processor to obtain, with respect to a virtual scene of an application executed on a client, a current attribute value of a life attribute of a first object in the virtual scene displayed by the client;
control code configured to cause at least one of the at least one processor to, based on a determination that the current attribute value is a first threshold, control a preset process to begin, wherein the preset process comprises controlling an attribute value of a target attribute of the first object in a preset range until the attribute value decreases to a preset threshold; and
restoration code configured to cause at least one of the at least one processor to restore the attribute value of the life attribute of the first object to another threshold based on a determination that a target event is completed before the preset process is over, the another threshold being greater than the first threshold.

20. A non-transitory computer-readable storage medium, comprising a program stored therein, the program being executable by at least one processor to perform:
obtaining, with respect to a virtual scene of an application executed on a client, a current attribute value of a life attribute of a first object in the virtual scene displayed by the client;
based on a determination that the current attribute value is a first threshold, controlling a preset process to begin, wherein the preset process comprises controlling an attribute value of a target attribute of the first object in a preset range until the attribute value decreases to a preset threshold; and
restoring the attribute value of the life attribute of the first object to another threshold based on a determination that a target event is completed before the preset process is over, the another threshold being greater than the first threshold.

* * * * *